Figure 1:
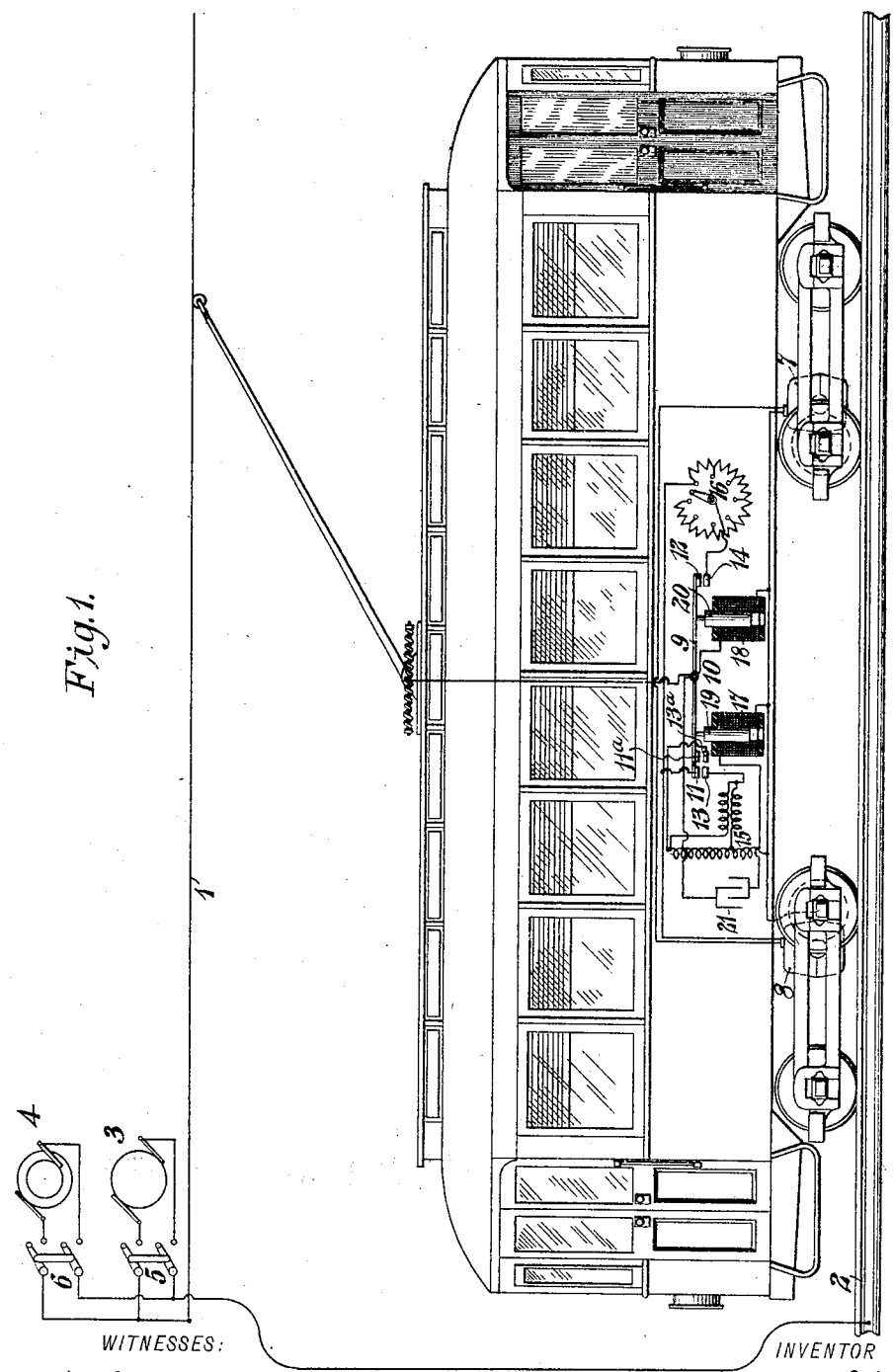

No. 774,764. PATENTED NOV. 15, 1904.
P. M. LINCOLN.
SYSTEM OF ELECTRICAL DISTRIBUTION.
APPLICATION FILED SEPT. 30, 1903.
NO MODEL. 2 SHEETS—SHEET 1.

WITNESSES:
C. L. Belcher
F. H. Miller.

INVENTOR
Paul M. Lincoln
BY
Wesley G. Carr
ATTORNEY

No. 774,764. PATENTED NOV. 15, 1904.
P. M. LINCOLN.
SYSTEM OF ELECTRICAL DISTRIBUTION.
APPLICATION FILED SEPT. 30, 1903.
NO MODEL. 2 SHEETS—SHEET 2.
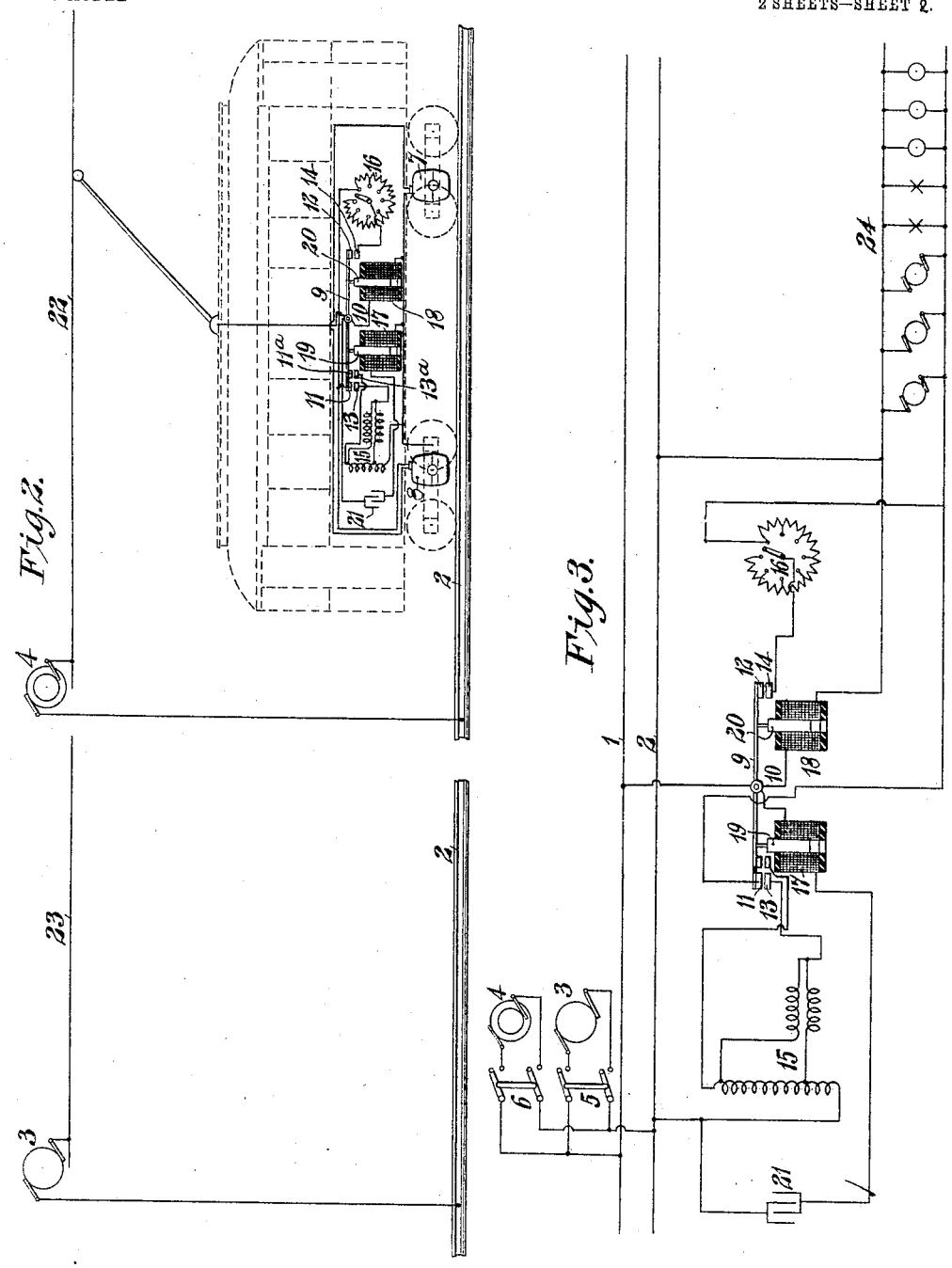
WITNESSES:
F. H. Miller.
Birney Hines
INVENTOR
Paul M. Lincoln
BY
Wiley S. Carr
ATTORNEY No. 774,764. Patented November 15, 1904.

UNITED STATES PATENT OFFICE.

PAUL M. LINCOLN, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 774,764, dated November 15, 1904.

Application filed September 30, 1903. Serial No. 175,194. (No model.)

*To all whom it may concern:*

Be it known that I, PAUL M. LINCOLN, a citizen of the United States, and a resident of Pittsburg, in the county of Allegheny and State of Pennsylvania, have invented a new and useful Improvement in Systems of Electrical Distribution, of which the following is a specification.

My invention relates to systems of electrical distribution; and it has for its object to provide a system which will permit of the use of either direct or alternating currents without any change in the apparatus employed except the switching of a direct-current generator into circuit and an alternating-current generator out of circuit, or vice versa, according to the kind of energy which it is desired to use.

In the accompanying drawings, Figure 1 is a side elevation of a railway-vehicle and a diagram of apparatus and circuits embodying my invention. Fig. 2 is a diagram of apparatus like that shown in Fig. 1, a modified arrangement of supply-circuits being shown and a vehicle being indicated by broken lines. Fig. 3 is a diagram of apparatus and circuits for supplying energy to translating devices other than railway-motors.

As shown in Fig. 1, current is supplied to a line-circuit, comprising a positive supply-conductor 1 and a return-conductor 2, which may be the rails and ground, as shown, or any other form of return-circuit, by means of either a direct-current generator 3 or an alternating-current generator 4, the former being cut into and out of circuit by means of a suitable double-pole switch 5 and the latter being similarly cut into and out of circuit by means of a double-pole switch 6. Of course a single-pole switch may be employed in connection with each generator, if desired.

The vehicle-motors 7 and 8 are here indicated as permanently connected in series; but of course they might be connected in parallel or means might be employed whereby they could be changed from series to parallel, and vice versa, in order to secure variations in speed. A single motor or more than two might also be employed. The motor or motors must of course be so designed and constructed as to be adapted for operation by either direct or alternating current.

As shown, one terminal of the motor 7 is connected to the conductor 2, and one terminal of the motor 8 is connected to a rocking arm or lever 9 of a switch 10, which is provided at one end with contact-terminals 11 and $11^a$, the former of which is insulated from the lever 9, and at the other end with a similar terminal 12, which terminals may be moved, respectively, into engagement with stationary contact-terminals 13, $13^a$, and 14.

The terminal 13 is connected to an induction-regulator 15, which may be of any suitable construction adapted for varying the electromotive force supplied from the generator 4 to the motor-circuit. The switch-terminal 14 is connected to one terminal of a resistance-varying rheostat 16, which may also be of ordinary construction and adapted to vary the electromotive force of the current supplied by the direct-current generator 3 to the motor-circuit.

In order that the switch 10 may be operated automatically in accordance with the type of generator which is connected in circuit, I provide two solenoids 17 and 18, the respective cores 19 and 20 of which are connected to opposite ends of the switch arm or lever 9. The solenoid 17 is connected between the conductor 2 and one terminal of a suitable condenser 21, the other terminal of the condenser being connected to the conductor 1 and the positive sides of the switches 5 and 6. The solenoid 18 is connected directly between the conductors 1 and 2 and preferably has a high degree of inductance and a comparatively low degree of ohmic resistance.

With the apparatus constructed and arranged as indicated in the drawings and above described if the switch 6 is closed and the switch 5 is open the alternating current will be transmitted through the condenser 21 and the solenoid 17, and the latter will actuate the switch to bring the contact-terminals 11 and $11^a$, respectively, into engagement with the terminals 13 and $13^a$, and thus connect the induction-regulator 15 in circuit with the motors, the relation being such that the solenoid exerts a greater pulling force than the solenoid 18. This condition is maintained so long as the alternating current is supplied to the work-circuit, and the speed of the motors will be controlled by means of the induction-regulator in a well-known manner. On the other hand, in case it is desired to operate the motor by means of direct current the switch 6 will be opened and the switch 5 closed, and since the direct current will not be transmitted through the condenser 21 it will pass through the solenoid 18, and the switch arm or lever 9 will be rocked to close the circuit through the motors and rheostat 16, the speed of the motors being regulated by proper adjustment of the rheostat 16.

The system shown in Fig. 2 is the same as that shown in Fig. 1, except that the alternating-current generator 4 supplies the conductors 22 and 2 of one section of a railway and the direct-current generator 3 supplies the conductors 23 and 2 of another section of the railway, the arrangement being such that vehicles or trains may be operated uninterruptedly from section to section without manipulation of feeder-switches.

The system shown in Fig. 3 differs from those shown in Figs. 1 and 2 only in the character of the translating devices 24, supplied with energy by the generators 3 and 4.

In cases where large contact-terminals are necessary on account of heavy currents a relay controlled by the switch 10 may be employed in accordance with well-understood practice, and the details of construction may be otherwise variously modified within the scope of my invention.

I claim as my invention—

1. In a system of electrical distribution, the combination with a source of direct currents, a source of alternating currents and translating devices to be supplied therefrom, of an alternating-current controller, a direct-current controller and means for automatically cutting either of said controllers out of circuit and the other into circuit when the corresponding generator is cut into or out of circuit.

2. In a system of electrical distribution, the combination with a source of direct current, a source of alternating current and translating devices adapted to be operated from either source, of a direct-current controller, an alternating-current controller, a switch for connecting either controller in circuit and disconnecting the other and electromagnetic means for operating said switch in accordance with the character of energy supplied thereto.

3. In a system of electrical distribution, the combination with a source of direct currents, a source of alternating currents and translating devices adapted to be operated from either source, of a switch, two actuating-magnets therefor one of which has a greater reactance than the other and a condenser in series with the magnet having the lesser degree of reactance.

4. In a system of electrical distribution, the combination with a source of direct currents, a source of alternating currents and translating devices adapted for operation by currents from either source, of a direct-current controller, an alternating-current controller, a switch for connecting either controller in circuit and disconnecting the other, two actuating-magnets for said switch, one of which has a lesser degree of reactance than the other, and a condenser in series with said magnet having the lesser degree of reactance.

In testimony whereof I have hereunto subscribed my name this 9th day of September, 1903.

PAUL M. LINCOLN.

Witnesses:
   OTTO S. SCHAIRER,
   BIRNEY HINES.